United States Patent
Herczeg

(10) Patent No.: US 10,615,534 B2
(45) Date of Patent: Apr. 7, 2020

(54) CHARGING SOCKET COVER FOR AN ELECTRICALLY OPERATED MOTOR VEHICLE

(71) Applicant: Dr. Ing. h.c. F. Porsche Aktiengesellschaft, Stuttgart (DE)

(72) Inventor: Gabor Herczeg, Leimen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/364,821

(22) Filed: Mar. 26, 2019

(65) Prior Publication Data

US 2019/0326701 A1   Oct. 24, 2019

(30) Foreign Application Priority Data

Apr. 20, 2018   (DE) .................. 10 2018 109 474

(51) Int. Cl.
   *H01R 13/447*   (2006.01)
   *B60L 53/16*    (2019.01)

(52) U.S. Cl.
   CPC ............ *H01R 13/447* (2013.01); *B60L 53/16* (2019.02)

(58) Field of Classification Search
   CPC .................................................. H01R 13/447
   See application file for complete search history.

(56) References Cited

U.S. PATENT DOCUMENTS

| | | | | |
|---|---|---|---|---|
| 6,231,107 B1* | 5/2001 | Mukai | ............... | B60K 15/05 220/86.2 |
| 7,261,360 B2* | 8/2007 | Busch | ............... | B60K 15/05 296/97.22 |
| 8,089,228 B2* | 1/2012 | Ballard | ............... | B60K 15/05 141/312 |
| 9,669,708 B2* | 6/2017 | Dunger | ............... | B60K 15/05 |
| 10,392,853 B2* | 8/2019 | Ren | ............... | E06B 3/52 |
| 2017/0356228 A1* | 12/2017 | Herczeg | ............... | E05F 15/60 |
| 2019/0047428 A1* | 2/2019 | Sha | ............... | E05C 19/16 |

* cited by examiner

*Primary Examiner* — Ross N Gushi
(74) *Attorney, Agent, or Firm* — RatnerPrestia

(57) ABSTRACT

A charging socket cover for an electrically operated motor vehicle having a closing apparatus, a pivoting apparatus and a drive apparatus. The pivoting apparatus is driven by way of the drive apparatus in order to pivot the closing apparatus between a closed position, in which the closing apparatus closes an opening which is made in a vehicle body part of the motor vehicle, and an open position, in which the closing apparatus releases the opening and is arranged substantially behind the vehicle body part. The pivoting apparatus and the drive apparatus are configured to pivot the closing apparatus by way of a rotational movement about a rotational axis and by way of a translational movement parallel to the rotational axis between the closed position and the open position and/or between the open position and the closed position.

9 Claims, 5 Drawing Sheets

CHARGING SOCKET COVER FOR AN ELECTRICALLY OPERATED MOTOR VEHICLE

CROSS-REFERENCE TO RELATED APPLICATION

This application claims priority to German Patent Application No. DE 10 2018 109 474.4, filed Apr. 20, 2018, which is incorporated by reference herein in its entirety.

FIELD OF THE INVENTION

The invention relates to a charging socket cover for an electrically operated motor vehicle, and to a method for actuating a charging socket cover of this type.

BACKGROUND OF THE INVENTION

Charging socket covers are known from the prior art which are arranged behind a vehicle body part of the motor vehicle in an open position. "Behind the vehicle body part" means offset in the direction of the interior of the motor vehicle. Behind the vehicle body part, the charging socket cover is not visible from the outside or is only partially visible in the open position for an observer or a user of the motor vehicle. The charging socket covers which are known from the prior art have lateral slotted guides which make a translational movement of the charging socket cover possible with respect to the vehicle body part. Said lateral slotted guides are particularly sensitive to wear and dirt, however. In addition, charging socket covers of this type are usually driven by way of a pulling/pushing cable, which is particularly expensive to produce.

SUMMARY OF THE INVENTION

Described herein is a charging socket cover which is particularly insensitive to wear and dirt and which can be produced simply and inexpensively.

According to aspects of the invention, the charging socket cover comprises a closing apparatus, a pivoting apparatus and a drive apparatus. The pivoting apparatus is driven by way of the drive apparatus in order to pivot the closing apparatus between a closed position, in which the closing apparatus closes an opening which is made in a vehicle body part of the motor vehicle, and an open position, in which the closing apparatus releases the opening and is arranged substantially behind the vehicle body part.

The pivoting apparatus and the drive apparatus are configured to pivot the closing apparatus by way of a rotational movement about a rotational axis and by way of a translational movement parallel to the rotational axis between the closed position and the open position and/or between the open position and the closed position.

The charging socket cover according to aspects of the invention is particularly insensitive to wear and dirt, and is particularly inexpensive to produce.

Furthermore, the drive apparatus is preferably configured to exert a torque on the pivoting apparatus.

This refinement makes it possible to use an electric motor as a drive apparatus, and thus makes inexpensive production of the charging socket cover possible.

In one preferred refinement, the pivoting apparatus comprises a deflecting device which is suitable partially converting the torque which is exerted on the pivoting apparatus by way of the drive apparatus into the translational movement parallel to the rotational axis.

The pivoting apparatus preferably comprises a first pivoting element which is connected rigidly to the closing apparatus, and a second pivoting element which is connected rigidly to the vehicle body part and/or the motor vehicle, the first pivoting element and the second pivoting element being configured to convert a rotational movement by the first pivoting element relative to the second pivoting element into a linear movement of the first pivoting element relative to the second pivoting element parallel to the rotational axis.

In one preferred refinement, the pivoting apparatus comprises a groove and a sliding block which engages into the groove during the pivoting of the closing apparatus between the closed position and the open position and/or between the open position and the closed position, either the sliding block being arranged on the first pivoting element and the groove being arranged on the second pivoting element, or the sliding block being arranged on the second pivoting element and the groove being arranged on the first pivoting element.

The groove preferably has the form of a curve which has a variable slope and runs around a shell of a cylinder.

Furthermore, the invention relates to a method for actuating a charging socket cover according to aspects of the invention. The method comprises driving the pivoting apparatus by way of the drive apparatus in order to pivot the closing apparatus between the closed position and the open position and/or between the open position and the closed position by means of a rotational movement of the closing apparatus about the rotational axis and by means of the translational movement of the closing apparatus parallel to the rotational axis.

In one preferred refinement, the pivoting apparatus is driven by way of the exertion of a torque on the pivoting apparatus by way of the drive apparatus.

The torque is preferably partially converted by means of the deflecting device into the translational movement parallel to the axis.

BRIEF DESCRIPTION OF THE DRAWING

Details and further advantages of the charging socket cover according to aspects or the invention and the method according to aspects of the invention will be explained using the exemplary embodiment which is described in the following text. In the drawing.

DETAILED DESCRIPTION OF THE INVENTION

Figure 1:
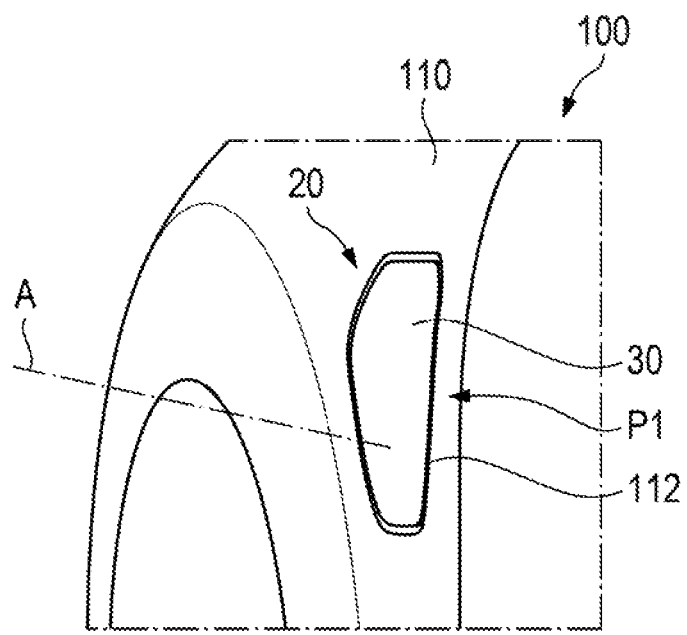
FIG. 1 shows a perspective view of a motor vehicle having a charging socket cover in accordance with the exemplary embodiment.
Figure 2:
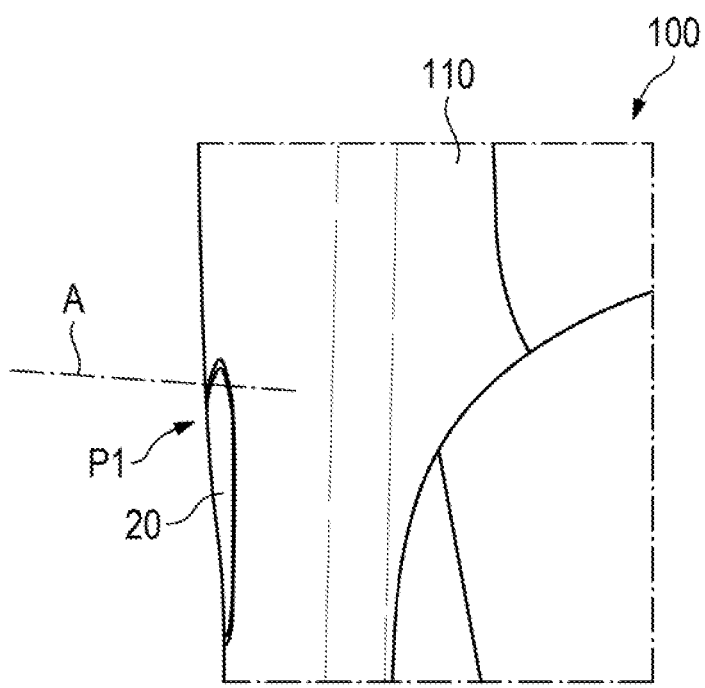
FIG. 2 shows a further perspective view of the motor vehicle having the charging socket cover in accordance with the exemplary embodiment.

The application relates to a charging socket cover 20 for an electrically operated motor vehicle 100 having a closing apparatus 30, a pivoting apparatus 40 and a drive apparatus 50. The pivoting apparatus 40 is driven by way of the drive apparatus 50 in order to pivot the closing apparatus 30 between a closed position P1, in which the closing apparatus 30 closes an opening 112 which is made in a vehicle body part 110 of the motor vehicle 100, and an open position P2, in which the closing apparatus 30 releases the opening 112 and is arranged substantially behind the vehicle body part 110.

The pivoting apparatus 40 and the drive apparatus 50 are configured to pivot the closing apparatus 30 by way of a rotational movement about a rotational axis A and by way of a translational movement parallel to the rotational axis A between the closed position P1 and the open position P2 and/or between the open position P2 and the closed position P1. In accordance with said configuration, the closing apparatus 30 can disappear behind the vehicle body part 110 in a simple way by way of a combined linear and rotational movement, that is to say the closing apparatus 30 is concealed by way of the vehicle body 110 for an observer standing outside the vehicle 100. A charging socket cover 20 of this type as a rule serves to close a charging port 120 of the motor vehicle 100.

The rotational axis A, parallel to which the translational component of the movement also takes place, is selected in such a way that the closing apparatus 30 can be pivoted in a space-saving way behind the vehicle body part 110. Here, the rotational axis A can be rotated twice in three-dimensional space, that is to say the rotational axis A intersects both the horizontal plane and a plane which is orthogonal with respect to a movement direction of the vehicle.

The open position P2 is illustrated in FIGS. 5, 7, 7a and 7b, and the closed position P1 is illustrated in FIGS. 1 to 4, 6, 6a and 6b.

If the closing apparatus 30 is transferred by way of the pivoting apparatus 40 from the closed position P1 into the open position P2, the closing apparatus 30 can first of all carry out a substantially linear movement in the direction of the interior of the motor vehicle 100, which substantially linear movement is followed by a combined rotational and translational movement. During the combined rotational and translational movement, the translational movement can continue to take place in the direction of the interior of the motor vehicle 100.

Furthermore, the drive apparatus 50 can be configured to exert a torque on the pivoting apparatus 40. As an alternative, the drive apparatus 50 can be configured to exert a force on the pivoting apparatus 40, in particular a force which runs parallel to the rotational axis A. The drive apparatus 50 can comprise a Bowden cable, a gearwheel drive and/or an electromagnet.

The pivoting apparatus 40 can comprise a deflecting device 42 which is suitable for partially converting the torque which is exerted on the pivoting apparatus 40 by way of the drive apparatus 50 into the translational movement of the closing apparatus 30.

The pivoting apparatus 40 can comprise a first pivoting element 44 which is connected rigidly to the closing apparatus 30, and a second pivoting element 46 which is connected rigidly to the vehicle body part 110 and/or the motor vehicle 100.

By way of the exertion of the torque on the pivoting apparatus 40, an element of the pivoting apparatus 40 can be set in rotation, for example the first pivoting element 44. If the drive apparatus 50 is configured to exert a force on the pivoting apparatus 40 or a force on the first pivoting element 44 of the pivoting apparatus 40, the pivoting apparatus 40 or the first pivoting element 44 of the pivoting apparatus 40 can be set in a translational movement. In accordance with said configuration, the deflecting device 42 can be configured to partially convert the force which is exerted on the pivoting apparatus 40 by way of the drive apparatus 50 into the rotational movement of the closing apparatus 30.

The first pivoting element 44 and the second pivoting element 46 can be configured to convert a rotational movement by the first pivoting element 44 relative to the second pivoting element 46 into a linear movement of the first pivoting element 44 relative to the second pivoting element 46 parallel to the rotational axis A. If the drive apparatus 50 is configured to exert a force on the pivoting apparatus 40 or a force on the first pivoting element 44 of the pivoting apparatus 40, the first pivoting element 44 and the second pivoting element 46 can be configured to convert a translational movement by the first pivoting element 44 relative to the second pivoting element 46 into a rotational movement of the first pivoting element 44 relative to the second pivoting element 46.

By virtue of the fact that the first pivoting element 44 is connected rigidly to the closing apparatus 30 and the second pivoting element 46 is connected rigidly to the vehicle body part 110 and/or the motor vehicle 100, the relative movement of the first pivoting element 44 with regard to the second pivoting element 46 brings about a corresponding movement of the closing apparatus 30 with respect to the vehicle body part 110 and/or the motor vehicle 100.

The pivoting apparatus 40 can comprise a groove 43 and a sliding block 41 which engages into the groove 43 during the pivoting of the closing apparatus 40 between the closed position P1 and the open position P2 and/or between the open position P2 and the closed position P1.

Figure 3:
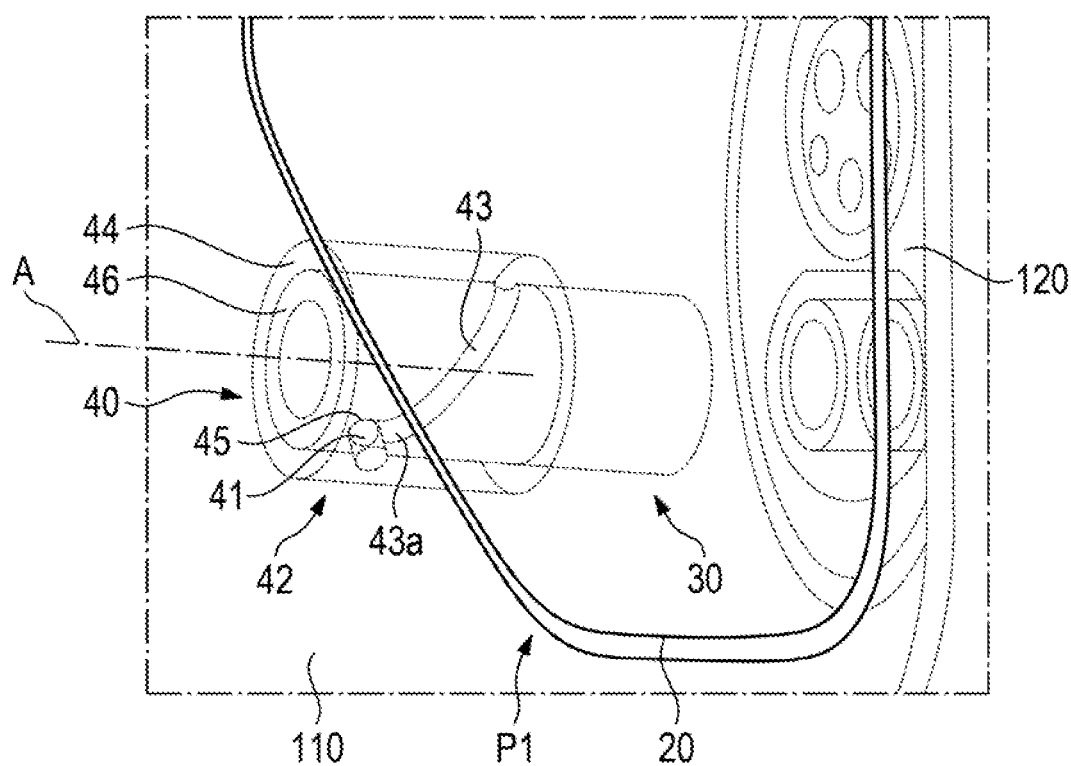
FIG. 3 shows a detailed view of the charging socket cover in accordance with the exemplary embodiment.
Figure 4:
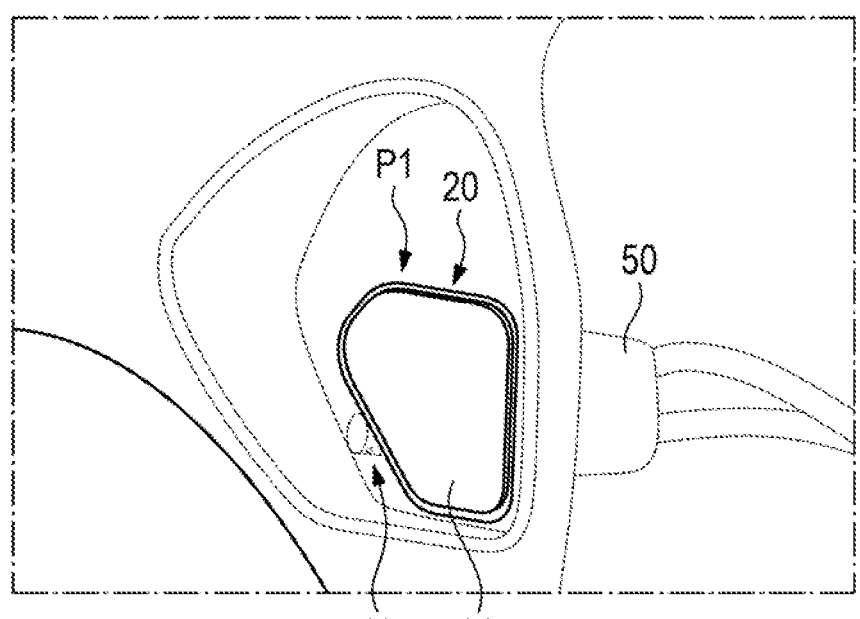
FIG. 4 shows a further perspective view of the motor vehicle having the charging socket cover in accordance with the exemplary embodiment.
Figure 5:
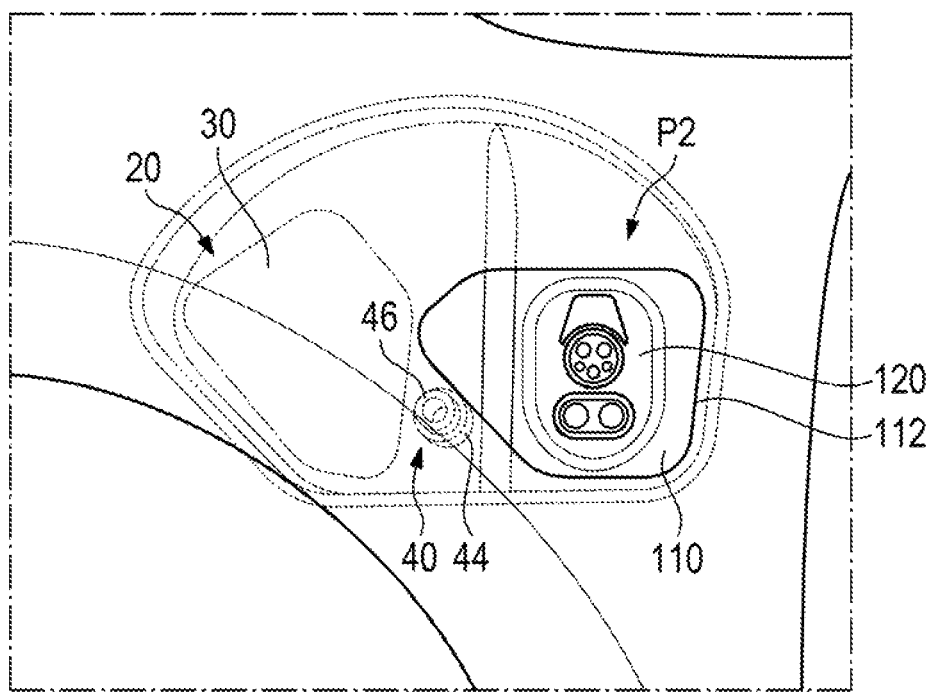
FIG. 5 shows a further perspective view of the motor vehicle having the charging socket cover in accordance with the exemplary embodiment in an open position.
Figure 6:
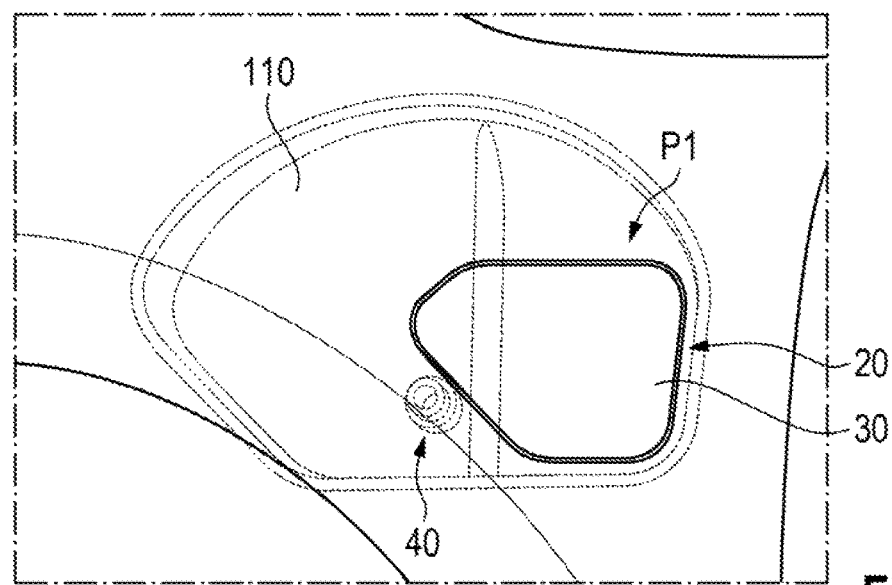
FIG. 6 shows a side view of the motor vehicle having the charging socket cover in accordance with the exemplary embodiment in a closed position.
Figure 6A:
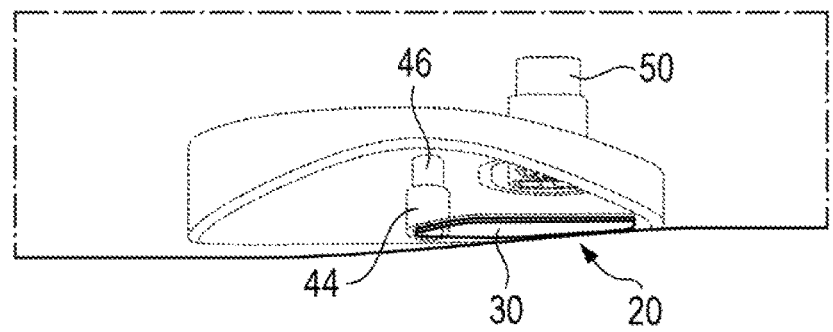
FIG. 6a shows a plan view of the motor vehicle having the charging socket cover in accordance with the exemplary embodiment in the closed position.
Figure 6B:
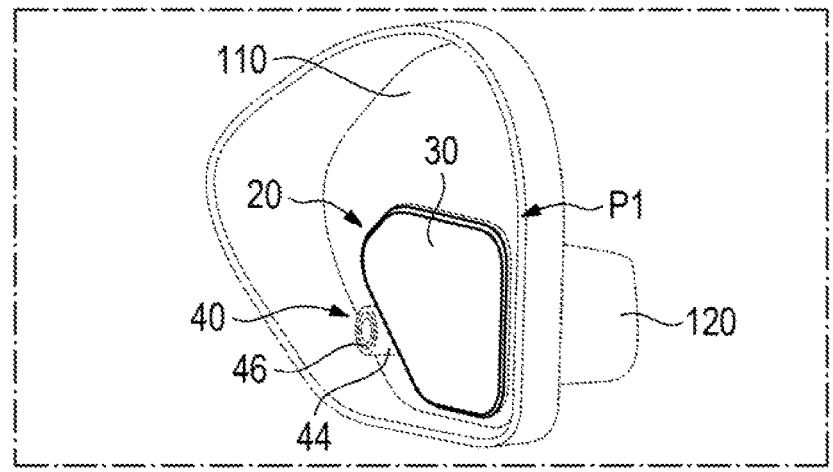
FIG. 6b shows a perspective view of the motor vehicle having the charging socket cover in accordance with the exemplary embodiment in the closed position.
Figure 7:
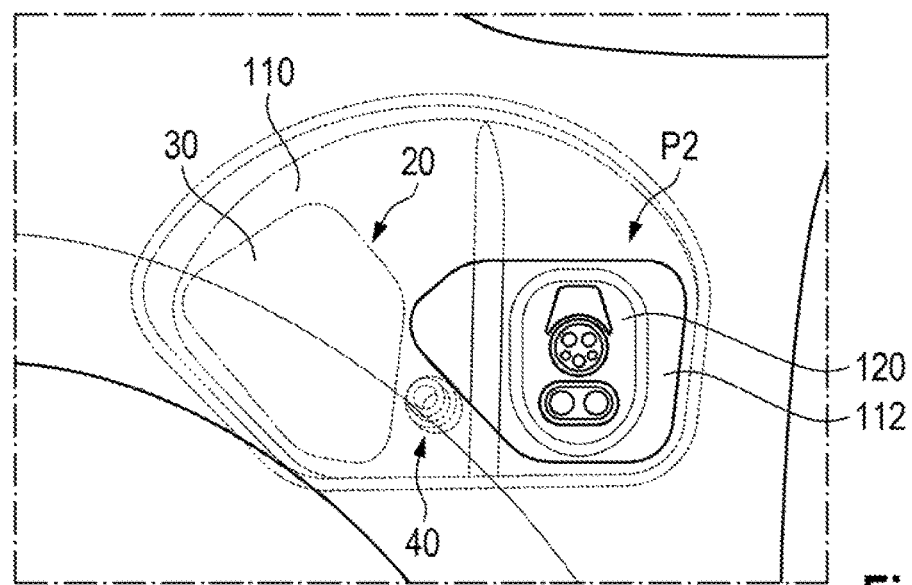
FIG. 7 shows a side view of the motor vehicle having the charging socket cover in accordance with the exemplary embodiment in the open position.
Figure 7A:
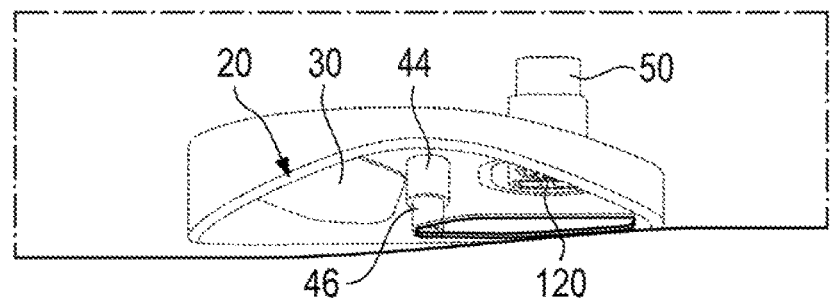
FIG. 7a shows a plan view of the motor vehicle having the charging socket cover in accordance with the exemplary embodiment in the open position.
Figure 7B:
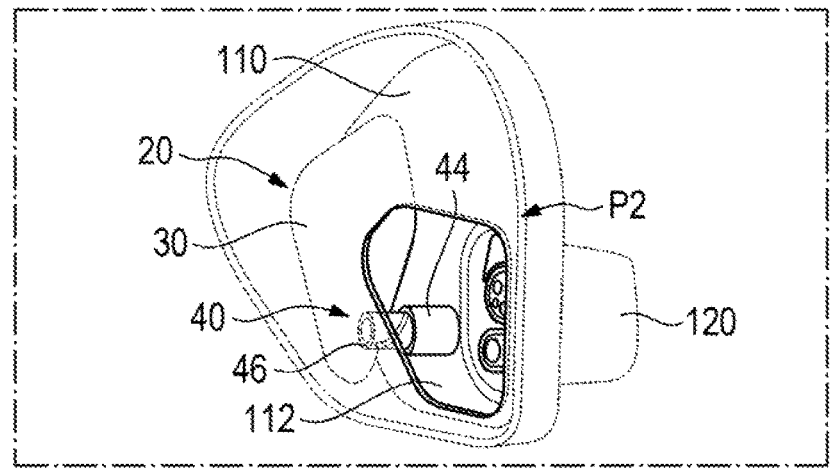
FIG. 7b shows a perspective view of the motor vehicle having the charging socket cover in accordance with the exemplary embodiment in the open position.

As can be seen from FIG. 3 in particular, the second pivoting element 46 can be a rod-shaped bearing element, on the outer circumferential face of which the groove 43 is formed. The first pivoting element 44 can be configured as a sleeve, on which the sliding block 41 is arranged. Here, the sliding block 41 can be arranged, in particular, on an inner face of the sleeve. In accordance with one preferred configuration, the sliding block 41 can be of spherical configuration. Accordingly, the groove 43 can have a circularly arcuate or semicircular cross section. The inner face of the sleeve can slide along the outer circumferential face of the rod-shaped bearing element parallel to the rotational axis A, while the pivoting apparatus 40 pivots the closing apparatus 30.

Preferably, either the sliding block 41 can be arranged on the first pivoting element 42 and the groove 43 can be arranged on the second pivoting element 44, or the sliding block 41 can be arranged on the second pivoting element 44 and the groove 43 can be arranged on the first pivoting element 42.

The groove 43 can extend along a curve which has a variable slope and runs around a shell of a cylinder. Here, an end section 43*a* of the groove 43 can have a particularly great slope, that is to say a course approximately parallel to the rotational axis A.

Furthermore, the application relates to a method for actuating a charging socket cover 20 in accordance with the application. The method comprises driving the pivoting apparatus 40 by way of the drive apparatus 50 in order to pivot the closing apparatus 30 between the closed position P1 and the open position P2 and/or between the open position P2 and the closed position P1 by means of a rotational movement of the closing apparatus 30 about the rotational axis A and by means of the translational movement of the closing apparatus 30 parallel to the rotational axis A.

The pivoting apparatus 40 can be driven by way of the drive apparatus 50 by way of the exertion of a torque on the pivoting apparatus 40.

The torque can be partially converted by means of the deflecting device 42 into the translational movement parallel to the rotational axis A.

What is claimed is:

1. A charging socket cover for an electrically operated motor vehicle, the charging socket cover comprising:
    a closing apparatus, a pivoting apparatus and a drive apparatus,
    wherein the pivoting apparatus is driven by way of the drive apparatus in order to pivot the closing apparatus between a closed position, in which the closing apparatus closes an opening in a vehicle body part of the motor vehicle, and an open position, in which the closing apparatus exposes the opening and is arranged substantially behind the vehicle body part,
    wherein the pivoting apparatus and the drive apparatus are configured to pivot the closing apparatus by way of a rotational movement about a rotational axis and by way of a translational movement parallel to the rotational axis (i) between the closed position and the open position, (ii) between the open position and the closed position, or (iii) both (i) and (ii),
    wherein the pivoting apparatus comprises a first pivoting element which is connected rigidly to the closing apparatus, and a second pivoting element which is connected rigidly to the vehicle body part, the motor vehicle, or both the vehicle body part and the motor vehicle,
    the first pivoting element and the second pivoting element being configured to convert a rotational movement by the first pivoting element relative to the second pivoting element into a linear movement of the first pivoting element relative to the second pivoting element parallel to the rotational axis,
    wherein the first pivoting element is coaxial with the second pivoting element and is configured to telescope along a length of the second pivoting element.

2. The charging socket cover as claimed in claim 1, wherein the drive apparatus is configured to exert a torque on the pivoting apparatus.

3. The charging socket cover as claimed in claim 2, wherein the pivoting apparatus comprises a deflecting device which is configured for partially converting the torque which is exerted on the pivoting apparatus by way of the drive apparatus into the translational movement of the closing apparatus.

4. The charging socket cover as claimed in claim 1, wherein the pivoting apparatus comprises a groove and a sliding block which engages into the groove during the pivoting of the closing apparatus between the closed position and the open position,
    the sliding block being arranged on one of the first pivoting element and the second pivoting element, and the groove being arranged on the other of the first pivoting element and the second pivoting element.

5. The charging socket cover as claimed in claim 4, wherein the groove extends along a curve which has a variable slope and runs around a shell of a cylinder.

6. The socket cover as claimed in claim 1, wherein the first pivoting element is aligned with one end of the second pivoting element in the open position and the first pivoting element is aligned with an opposite end of the second pivoting element in the closed position.

7. The socket cover as claimed in claim 1, wherein the second pivoting element has a first end which is substantially flush with a charging socket and a second end that is substantially flush with an interior facing side of the vehicle body part.

8. The socket cover as claimed in claim 7, wherein a first end of the first pivoting element is aligned with the first end of the second pivoting element in the open position of the closing apparatus, and a second opposite end of the first pivoting element is aligned with the second end of the second pivoting element in the closed position of the closing apparatus.

9. The socket cover as claimed in claim 1, wherein the second pivoting element has a greater length than the first pivoting element.

* * * * *